United States Patent [19]

Akagi

[11] Patent Number: 4,887,896
[45] Date of Patent: Dec. 19, 1989

[54] HANDY SPECTACLES

[75] Inventor: Terumi Akagi, Tokyo, Japan

[73] Assignee: Aoyama Gankyo Kabushiki Kaisha, Sabae, Japan

[21] Appl. No.: 250,699

[22] Filed: Sep. 29, 1988

[30] Foreign Application Priority Data

Oct. 5, 1987 [JP] Japan ................... 62-151694

[51] Int. Cl.$^4$ ............................................. G02C 5/08
[52] U.S. Cl. ................................................ 351/63
[58] Field of Search ................... 351/41, 63, 111, 119, 351/64

[56] References Cited

U.S. PATENT DOCUMENTS 2,307,419  1/1943  McNeill et al. .................. 351/63

Primary Examiner—Rodney B. Bovernick
Attorney, Agent, or Firm—Staas & Halsey

[57] ABSTRACT

This invention relates to handy spectacles comprising of the front frame material having a pair of lens thereupon, a pair of the temple material connected with the said front frame material, the said temple material having the sheath which is equipped with the mouth wherefrom the said front frame material comes in and with the retractable system wherein the ear-rack rod is to be stored, and finally the front frame material, the temple material and the ear-rack rod, these three parts comes into a perfect one piece body in the thinnest size for easier carriage.

4 Claims, 4 Drawing Sheets

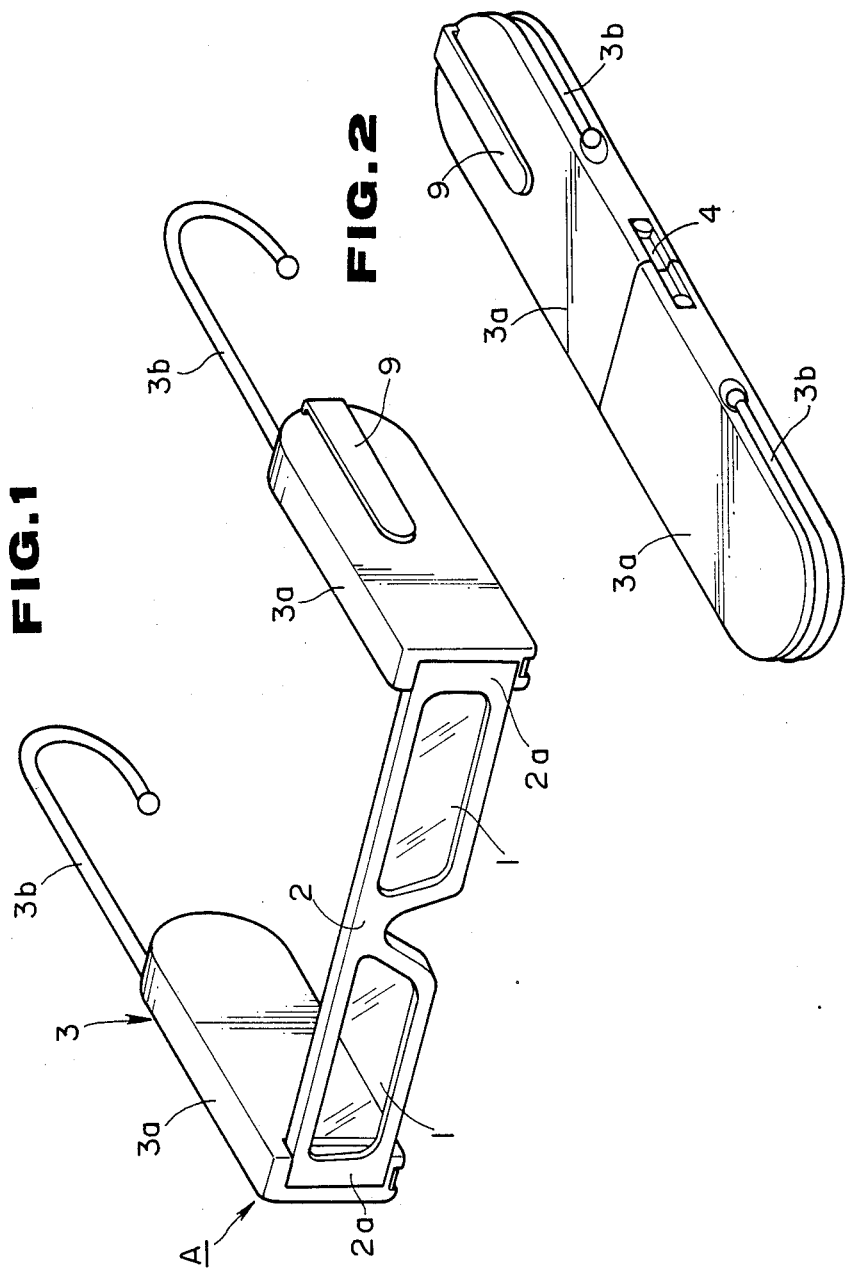

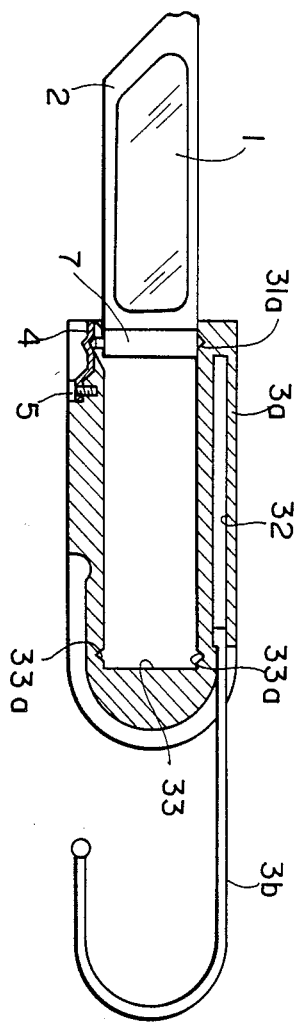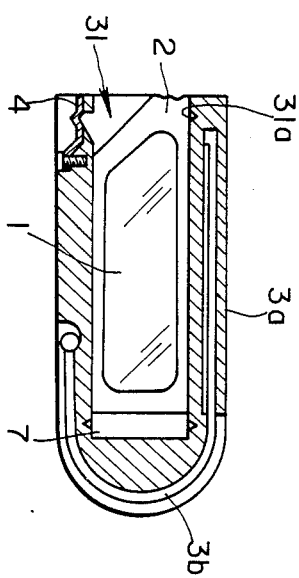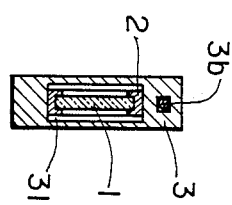

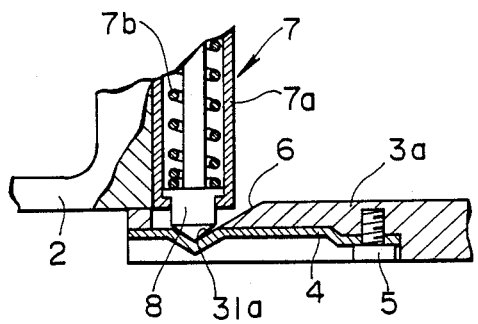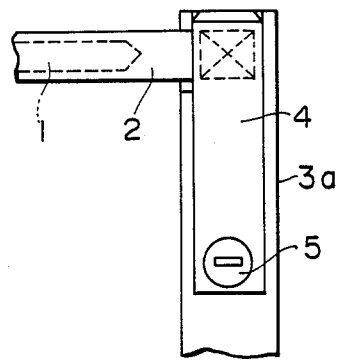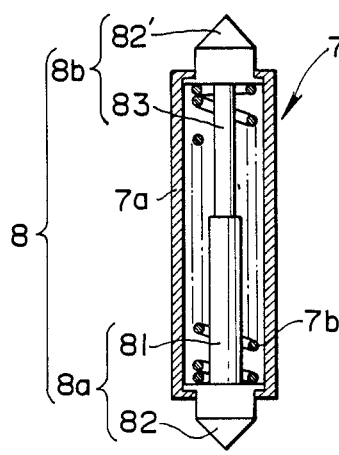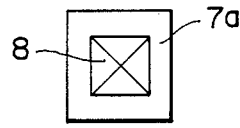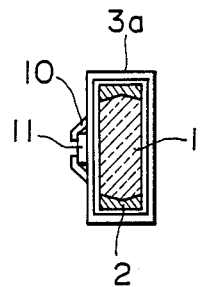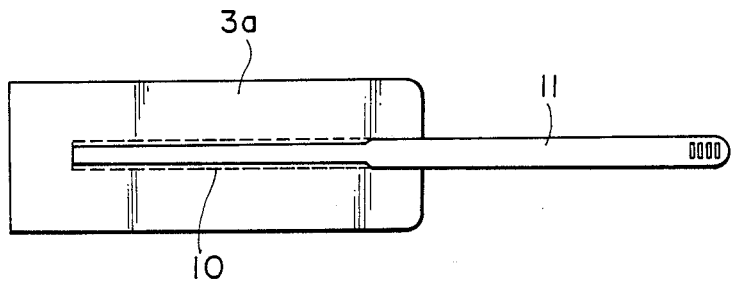

HANDY SPECTACLES

BACKGROUND OF THE INVENTION

There are generally two purposes for the use of the spectacles. One is for recovery of poor eyesight, such as myopia, hypermetropia, antigatism and presbyopia, and the other is for the protector against dazzling caused by direct light and disorder caused by ultra violet beam or electromagnetic wave and so on. The spectacles are normally stored in the dress pocket, and they are mainly used on demands of situations.

The spectacles, regardless of using purposes, have a front frame material holding the lenses just before human eyes and the temple material in the bracket style connecting with both sides of the said frame material as their fundamental constructions, and the said temple material is hinge-connected with the said front frame material in the foldable conditions. People store and carry their spectacles with them, and the spectacles case made of plastic or made of cloth is usually supplied as storing purpose, but such a case is sometimes too bulky to be pocketable. Therefore, it is general tendency for people, especially for young generations, to carry their spectacles without such case at all, putting the same into the front pocket or inside pocket. When in the crowded places such as in a train or bus, the stored spectacles without case shall be easily crushed or be distorted in the front frame part by the shock, and shall be damaged largely on the finished surface of the lense or frame.

SUMMARY OF THE INVENTION

The primary object of this invention is to provide the practical spectacles wherein a front frame meterial and the temple material both come into one piece body to be formed into handy situations.

It has another object to make the said one piece body in the thinnest conditions, so that it may be smoothly stored in the pocket for carriage.

It has also an object to provide the said body guaranteeing the lens, front frame and other important points from damaged during carriage in the pocket.

It has a further object to provide the handy spectacles not to be soiled nor to be strained by dusts during carriage in the pocket, so that the spectacles are always usable with clean lens in case of necessity.

Other and further objects of the present invention will appear in the course of the descriptions thereof which follows.

BRIEF DESCRIPTIONS OF THE DRAWINGS

FIG. 1 is a perspective view showing the spectacles just ready for wearing.

FIG. 2 is a perspective view showing one piece body containing the relative spectacles in its inside.

FIG. 5 is a partially cutaway sectional view showing that the front frame material and the temple material are just about to be drawn on a straight line.

FIG. 6 is a partially cutaway sectional view showing the relative conditions of each part in case of drawing the front frame material and the temple material.

FIG. 7 is a A-A diamagramatic and side view showing the action of the above FIG. 6.

FIG. 8 is a partly enlarged sectional view showing the constructure of the hinge part whereon the front frame material and the temple material are connected.

FIG. 9 is a bottom view showing the temple material is in the state of braket against the front frame material.

FIG. 10 is a sectional view showing an example of hinge material used for the relative spectacles.

FIG. 11 is a plan view of the above FIG. 11.

FIG. 12 is a side view showing another example of the temple material used for the relative spectacles.

FIG. 13 is a horizontal side view of the above FIG. 12.

DETAILED DESCRIPTIONS OF THE PREFERRED EMBODIMENTS

Figure 3:
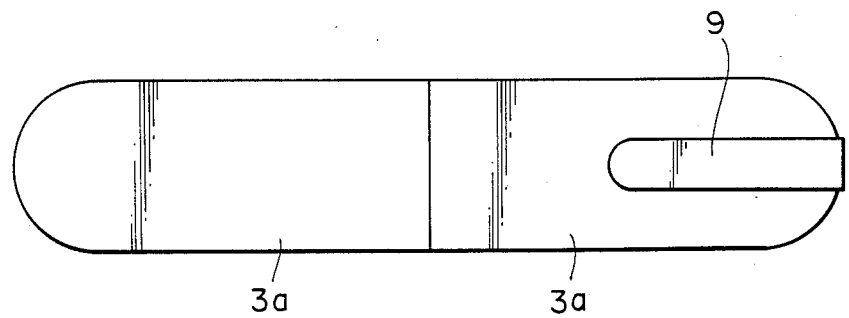
FIG. 3 is a plan view of the above FIG. 2.

In order to clear the various problems as mentioned aforsaid, this invention has developed the new technical points: Each of the temple material (3) hinge-connected with the front frame material (2) having the lenses (1) are comprised of sheath (3a) which is devised to have open mouths on one end wherefrom the said front frame material (2) is available to come in and out via the movement of the pivot (8) equipped at the mouth part and also devised on the other end the ear-rack rod (3b) as retractable, whereas the front frame material (2) enters the sheath as well as the ear-rack (3b) is retracted into the relative sheath (3a).

Now, the preferred embodiments shall be explained in accordance with the drawings.

Mark A is the spectacles to be applied of the present invention. This marked A spectacles is equipped with plastic made front frame material (2) having the lenses (1) and also equipped with a pair of the temple material (3.3) connected by hinge to both sides (2a.2a) of the front frame material (2).

The said temple material (3) is formed in the style of the sheath (3a) having the sheath hole (31), whereon one end connecting with the front frame material has an open mouth while the other end has the ear-rack rod as retractable like telescopic method. The front frame material (2) is hinged to the mouth of the sheath (3a) by the pivot (8), so that the said front frame material (2) shall slide in smoothly in the sheath hole (31).

As shown in FIG. 10, on the both sides (2a.2a) of the front frame material (2), a shaft case (7.7) is prepared, wherein both sides of the pivot (8) are pressured by the spring (7b) for free movement. The pivot (8) is composed of female axis piece (8a) having the square cone top (82) over the piping axis (81) and of male axis piece (8b) having the square cone top (82') over the smaller diameter axis (83) coming into the said piping axis (81) freely. The said two axes (81.83) are installed in the inside of the shaft box (7) pressurized by the spring (7b), whereas the movement of the pivot (8) is obtained accordingly.

On the other hand, in the sheath hole (31), on the mouth and on the end hole, a pair of pivot hole exactly corresponding up and down is formed each on these two parts. These pivot holes (31a.31b) are preferrable to be prepared in the exact styles of the said square cone tops (82.82'), and it is also recommendable to make one of the pivot hole (31a) as the elastic system. As shown in the example of FIG. 8, the pivot hole (31a) downwards is drilled over the leaf spring (4) sustained by the screw (5). Accordingly, the temple material (3) shall be comfortably bendable at 90 degree angle as its limit by the mutual work of the square cone tops (82.82') and the pivot holes (31a.31a).

On the mouth of the sheath hole (31), the slope (6) is formed in accordance with the exact angle of the pivot hole (31a) along the tapering line, wherefore, in case of using the front frame material (2) in normal condition, the square cone tops (82.82') of the pivot (8) established on the side (2a) of the front frame material through the shaft case (7) will come in and set stably at the said pivot hole (31a) by the natural guidance of the said slope (6), and finally the function of the hinge is obtained, whereas the temple material (3) is bendable with ease. On the contrary, in case if the spectacles are desired to be stored, you may develop the temple material (3) upto the straight line of the front frame material (2) and push the said front frame material (2) into the sheath hole inwardly, then the front frame material (2) shall come into the sheath hole gradually and smoothly through the movement of the explained pivot theory.

A pair of the ear-rack (3b.3b) is prepared as freely retractable like telescopic method over along the sheath (3a), and it shall be smoothly retracted into the retract hole (32).

Mark 9 is the pocket clip to be prepared on the outer surface of the sheath (3a), so that the handy spectacles after stored into one piece body may be clipped on the front pocket or inside pocket accordingly for simple and firm carriage.

The fundamental mechanisms are explained as aforsaid, and further details of the relative embodiments shall be explained as follows.

Figure 4:
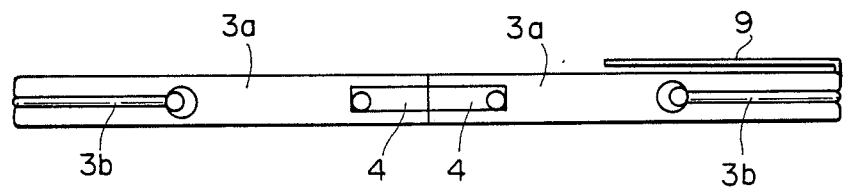
FIG. 4 is a side view of the above FIG. 2.

First, in order to store the spectacles into one piece body, open the temple piece material (3.3) namely the sheath (3a.3a) toward the front frame material (2) at the falcrum of the pivot (8) formed at hinge part until it comes to one straight line with the front frame material (2) as shown in FIG. 5, then retract the ear-rack rod (3b.3b) to the sheath (3a.3a), and finally, as shown in FIG. 6, push the front frame material (2) into the sheath (3a.3a) via sliding movement whereas the hinge connection between the pivot (8) and the pivot hole (31a) is released smoothly, so that the front frame material (2) comes into the sheath (3a.3a). The storing situations obtained are seen in FIG. 2, FIG. 3 and FIG. 4 as the outer appearances, while FIG. 6 shows the mechanical conditions. After the complete storing, the square cone tops (82.82') of the pivot (8) arrive at the inside end of the sheath (3a.3a) whereon the said tops snap in the pivot holes (31b.31b) accordingly. Therefore, the front frame material (2) shall be stapled and never be loosen out, and it shall be carried compactly clipped with the front pocket.

Secondly, on the contrary, in order to use the spectacles from the one piece body, pull out the ear-rack rod (31b.31b) from the sheath (3a.3a) and also pull out the front frame material (2) from the mouth (31) of the sheath whereon the square cone tops (82.82') snap in the pivot hole (31a.31a) as shown in FIG. 5. Then, bend the temple material (3.3) toward the inside at 90 degree angle, then the situations of FIG. 1 is obtained.

As specified so far, the present invention has developed the temple materials to be hinge-connected with both sides of the front frame material with following features:

(a) The temple material has the sheath with its mouth on one end toward the hinge part, (b) the temple material has the retractable device on the sheath for ear-rack rod on the other end, (c) the temple material is available to store the front frame material in its sheath completely.

As a result, handy spectacles are realized by the simple and easy operation, far from damaging the lens or other decorations, free from dusts and perspirations, stored into one piece body.

One piece body developed by this invention comes very thin and flat, and its design is very unique beyond the past conceptions, wherefore this spectacles are acceptable to general people and especially welcome to young people as daily accesories. It may be safely said this invention shall overcome all problems and defects which have been suffered on carrying the spectacles Furthermore, this invention is of simple mechanism and simple structure while it is quite suitable for mass production, wherefore the cost down of the relative products shall be easily incurred for the actual production procedure.

While there has been described and shown with reference to preferred embodiments thereof, it will be understood by those skilled in the art that the foregoing and other changes in form and details can be made therein without departing from the spirit and scope of the present invention. For instance, with regard to the pivot hole (31a.31a), this invention shows the elastic method only on the bottom side, but of couse this elastic method shall be performed on the both sides, bottom and up. The elastic material is shown as leaf spring, but of course other substitutions are available in stead of the relative spring. For the second instance, the retractable system for the ear-rack rod (3b.3b) is explained in the telescopic system, but as shown in FIG. 12 and FIG. 13, the ditch rail (10.10) is formed on the side of the sheath (3a.3a), wherein the ear-rack rod (11.11) in the plate style is formed and is moving freely. For the third instance, the front frame material (2) is available to be manufactured with the lenses (1.1) at one stage through the simple transferring process and mold.

What is claimed is:

1. Spectacles comprising:
    a front frame supporting a pair of lenses and having opposite longitudinal ends;
    a pair of temples, each having a sheath, and each sheath having two opposite ends, an axial passage way provided in one of the opposite axial ends and a second axial passageway provided in the opposite axial end, and an ear stem retractable into and out of the second axial passageway, and the frame being retractable into and out of the first axial passageway; and
    sliding pivotal connection means disposed in the first axial passageway for pivotally and slidably connecting each sheath to the opposite ends of the frame to thereby permit the sheaths to pivot relative to the frame and slide over the frame when the sheaths are pivoted into alignment with the frame.

2. Spectacles according to claim 1, wherein the sliding pivotle means comprises a pair of pivots mounted on the opposite ends of the frame, each pivot having two pivot posts spring biased outwardly to engage a pivot hole provided in the sheath.

3. Spectacles according to claim 2 wherein the pivot posts are squarecone-shaped protrusions provided on distal ends of mating axial portions which are biased in opposite directions by a spring.

4. Spectacles according to claim 3 wherein the sheaths of the temples completely enclose the frame in the retracted position.

* * * * *

UNITED STATES PATENT AND TRADEMARK OFFICE
CERTIFICATE OF CORRECTION

PATENT NO. : 4,887,896

DATED : December 4, 1989

INVENTOR(S) : Terumi Akagi

It is certified that error appears in the above-identified patent and that said Letters Patent is hereby corrected as shown below:

Columns 1-4, should be deleted and replaced with columns 1-4 as shown on the attached pages.

Col. 1, line 6, "antigmatism" should read --astigmatism--

Col. 2, line 36, "(2a.2a)" should read --(2a,2a)--

Col. 3, line 5, "he" should read --the--

Col. 3, line 38, "(3a.3a)" should read --(3a,3a)--

Signed and Sealed this

Sixth Day of July, 1993

Attest:

MICHAEL K. KIRK

Attesting Officer

Acting Commissioner of Patents and Trademarks

United States Patent [19]

Akagi

[11] Patent Number: 4,887,896

[45] Date of Patent: Dec. 19, 1989

[54] HANDY SPECTACLES

[75] Inventor: Terumi Akagi, Tokyo, Japan

[73] Assignee: Aoyama Gankyo Kabushiki Kaisha, Sabae, Japan

[21] Appl. No.: 250,699

[22] Filed: Sep. 29, 1988

[30] Foreign Application Priority Data

Oct. 5, 1987 [JP] Japan .................... 62-151694

[51] Int. Cl.$^4$ .................................. G02C 5/08
[52] U.S. Cl. .................................... 351/63
[58] Field of Search ............... 351/41, 63, 111, 119, 351/64

[56] References Cited

U.S. PATENT DOCUMENTS 2,307,419  1/1943  McNeill et al. ................. 351/63

Primary Examiner—Rodney B. Bovernick
Attorney, Agent, or Firm—Staas & Halsey

[57] ABSTRACT

This invention relates to spectacles having a front frame with a pair of lenses thereupon, and a pair of temples connected with the said front frame. The temples have a sheath which is equipped with an open end wherefrom the said front frame comes in and out. Retractable ear stems are provided opposite the open end. The front frame, the temples and the ear stems come into a perfect one piece body in the thinnest size for easier carriage.

4 Claims, 4 Drawing Sheets

HANDY SPECTACLES

There are generally two purposes for the use of spectacles. One is for recovery of poor eyesight, such as myopia, hypermetropia, antigmatism and presbyopia, and the other is for the protection against direct light and disorder caused by ultra violet beams or electromagnetic waves and so on. Spectacles are normally stored in clothing pockets, and their use is dictated by the situation.

Spectacles, regardless of use, have a front frame material holding the lenses just before human eyes and temples in the bracket style connecting with both sides of the said frame material as their fundamental constructions. The temples are hinge-connected with the front frame material in the foldable conditions. People store and carry their spectacles with them, and the spectacles case made of plastic or made of cloth is usually supplied as storing purpose, but such a case is sometimes too bulky to be pocketable. Therefore, it is general tendency for people, especially for younger people, to carry their spectacles without such cases at all, putting the same into the front pocket or inside pocket. When in crowded places such as in a train or bus, the stored spectacles without case will be easily crushed or be distorted in the front frame part by the shock, and will be damaged largely on the finished surface of the lens or frame.

SUMMARY OF THE INVENTION

The primary object of this invention is to provide practical spectacles wherein a front frame and the temples both come into a one piece body to be formed into handy situations.

It is another object to make the said one piece body as thin as possible, so that it may be smoothly stored in the pocket for carriage.

It is another object to provide a body for protecting the lens, front frame and other important points from damage during carriage in the pocket.

It is a further object to provide a handy spectacles not to be soiled nor to be strained by dust during carriage in the pocket, so that the spectacles are always usable with clean lens in case of necessity.

Other and further objects of the present invention will appear in the course of the descriptions thereof which follows.

BRIEF DESCRIPTIONS OF THE DRAWINGS

FIG. 1 is a perspective view showing the spectacles just ready for wearing.

FIG. 2 is a perspective view showing one piece body containing the relative spectacles in its inside.

FIG. 3 is a plan view of the above FIG. 2.

FIG. 4 is a side view of the above FIG. 2.

FIG. 5 is a partially cutaway sectional view showing that the front frame material and the temple material are just about drawn on a straight line.

FIG. 6 is a partially cutaway sectional view showing the stored position of the temple material.

FIG. 7 is a diagrammatic and side view showing the action of the above FIG. 6.

FIG. 8 is a partly enlarged sectional view showing the construction of the hinge part whereon the front frame material and the temple material are connected.

FIG. 9 is a bottom view showing the temple material is in the state of bracket against the front frame material.

FIG. 10 is a sectional view showing an example of hinge material used for the relative spectacles.

FIG. 11 is a plan view of the hinge of FIG. 10.

FIG. 12 is a side view showing another example of the temple material used for the relative spectacles.

FIG. 13 is a horizontal side view of the above FIG. 12.

DETAILED DESCRIPTION OF THE PREFERRED EMBODIMENTS

In order to clear the various problems as mentioned aforesaid, this invention has developed the following technical points: each of the temples (3) are hinge-connected with the front frame (2) having the lenses (1), and include sheath portions (3a) which are devised to have open ends wherefrom the said front frame (2) is available to come in and out via the movement of a pivot (8) provided near the open ends. Ear stems (3b) are provided on the other end and are retractable therein. Thus, the front frame (2) enters the sheath as well as the ear stems (3b).

Now, the preferred embodiments shall be explained in accordance with the drawings.

Mark A denotes generally the spectacles of the present invention. The spectacles are equipped with a plastic front frame (2) holding the lenses (1) and also equipped with a pair of the temples (3) connected by hinges to both sides (2a) of the front frame (2).

The temples (3) include a sheath (3a) having an axial passageway (31) and an open end for slidably receiving the front frame. The other end of the sheath (3a) has an ear stem telescopically received therein. The front frame (2) is hinged to the open end of the sheath (3a) by a pivot (8), so that the said front frame (2) slides in smoothly in the axial passageway (31).

As shown in FIG. 10, on the both sides (2a.2a) of the front frame (2), a shaft case (7) is disposed, wherein both ends of the pivot (8) are biased outwardly by a spring (7b) for free movement. The pivot (8) is composed of female axle piece (8a) having a square cone top (82) fitted on a pipe axle (81), and a make axle piece (8b) having a square cone top (82') fitted on a smaller diameter axle (83) coming into the said pipe axle (81) freely. The two axles (81, 83) are installed on the inside of the shaft case (7) and biased by the spring (7b), whereas the movement of the pivot (8) is obtained accordingly.

On the other hand, in the axial passageway (31), at the open end thereof, a pair of aligned pivot holes are formed each on these two parts. These pivot holes (31a, 31b) are preferably to be prepared in the exact styles of the said square cone tops (82, 82'), and it is also preferable to make one of the pivot hole (31a) with an elastic mechanism. As shown in the example of FIG. 8, the pivot holes (31a) downwards is drilled over a leaf spring (4) sustained by screw (5). Accordingly, the temples (3) are comfortably bendable at 90 degree angle as its limit by the mutual work of the square cone tops (82, 82') and the pivot holes (31a,31a).

On the open end of the axial passageway (31), a slope surface is formed in accordance with the exact angle of the pivot hole (31a) along a tapering line, wherefore, in case of using the front frame (2) in a normal condition, the square cone tops (82, 82') of the pivot (8) established on the side (2a) of the front frame through the shaft case (7) will come in and set stably at the pivot hole (31a) by the natural guidance of the sloped surface (6), and finally the function of the hinge is obtained, whereas the temples (3) are bendable with ease. On the contrary, in case the spectacles are desired to be stored, the temples (3) may be articulated to a straight line with the front frame (2) whereupon the front frame (2) is pushed into the axial passageway inwardly. Then, the front frame (2) slides into he axial passageway gradually and smoothly through the movement of the pivot (8) theory wherein the T of 5 (82, 82') are cammed inwardly by the sloped surfaces (6).

A pair of ear stems (3b) are disposed as freely retractable and telescopically into the sheaths (3a), and it shall be smoothly retracted into the smaller axial passageway (32) which opens at the opposite end of the sheath (3a).

Numeral 9 is a pocket clip to be prepared on the outer surface of the sheath (3a), so that the handy spectacles after stored into one piece body may be clipped on the front pocket or inside pocket accordingly for simple and firm carriage.

The fundamental mechanisms are explained as aforesaid, and further details of the relative embodiments shall be explained as follows:

First, in order to store the spectacles into one piece body, rotatably move the temples (3), namely the sheaths (3a) toward alignment with the front frame (2) at the fulcrum of the pivot (8) formed at the hinge part until it comes to one straight line with the front frame (2) as shown in FIG. 5. Then, retract the ear stems (3b) into the sheaths (3a,3a). Finally, as shown in FIG. 6, push the front frame (2) axially into the sheath (3a,3a) via sliding movement whereas the hinge connection between the pivot (8) and the pivot hole (31a) is released smoothly, so that the front frame (2) comes into the sheath (3a,3a). The storing situations obtained are seen in FIG. 2, FIG. 3 and FIG. 4 as the outer appearances, while FIG. 6 shows the mechanical conditions. After the complete storing, the square cone tops (82,82') of the pivot (8) arrive at the inside end of the sheath (3a.3a) whereon the tops snap in the pivot holes (31b) accordingly. Therefore, the front frame (2) is stabilized and will never be loosened out, and it shall be carried compactly clipped with the front pocket.

Secondly, on the contrary, in order to use the spectacles from the one piece body, pull out the ear stems (31b) from the sheath (3a) and also pull out the front frame (2) from the passageway (31) of the sheath whereon the square cone tops (82,82') snap in the pivot holes (31a) as shown in FIG. 5. Then, rotate the temples (3) toward the inside to achieve a 90 degree angle, then the disposition of FIG. 1 is obtained.

As specified so far, the present invention has developed the temples to be hinge-connected with both sides of the front frame material with following features:

(a) The temples have a sheath with its open end on one end toward the hinge part, (b) the temples have a retractable device on the sheath for ear stems on the other end, (c) the temples are available to store the front frame in its sheath completely.

As a result, handy spectacles are realized by the simple and easy operation, far from damaging the lens or other decorations, free from dusts and perspiration, stored into one piece body.

One piece body developed by this invention comes very thin and flat, and its design is very unique beyond the past conceptions, wherefore this spectacles are acceptable to general people and especially welcome to young people as daily accessories. It may be safely said this invention shall overcome all problems and defects which have been suffered on carrying the spectacles.

Furthermore, this invention is of simple mechanism and simple structure while it is quite suitable for mass production, wherefore the cost down of the relative products shall be easily incurred for the actual production procedure.

While there has been described and shown with reference to preferred embodiments thereof, it will be understood by those skilled in the art that the foregoing and other changes in form and details can be made therein without departing from the spirit and scope of the present invention. For instance, with regard to the pivot holes (31a), this invention shows the elastic method only on the bottom side, but of course this elastic method shall be performed on the both sides, bottom and up. The elastic material is shown as leaf spring, but of course other substitutions are available instead of the relative spring. For the second instance, the retractable system for the ear stems (3b) is explained in the telescopic system, but as shown in FIG. 12 and FIG. 13 a ditch rail (10) could be formed on the side of the sheath (3a), wherein the ear stems (11) in the plate style is formed and is moving freely. For the third instance, the front frame material (2) is available to be manufactured with the lenses (1) at one stage through the simple transferring process and mold.

What is claimed is:

1. Spectacles comprising:
a front frame supporting a pair of lenses and having opposite longitudinal ends;
a pair of temples, each having a sheath, and each sheath having two opposite ends, an axial passageway provided in one of the opposite axial ends and a second axial passageway provided in the opposite axial end, and an ear stem retractable into and out of the second axial passageway, and the frame being retractable into and out of the first axial passageway; and
sliding pivotal connection means disposed in the first axial passageway for pivotally and slidably connecting each sheath to the opposite ends of the frame to thereby permit the sheaths to pivot relative to the frame and slide over the frame when the sheaths are pivoted into alignment with the frame.

2. Spectacles according to claim 1, wherein the sliding pivotle means comprises a pair of pivots mounted on the opposite ends of the frame, each pivot having two pivot posts spring biased outwardly to engage a pivot hole provided in the sheath.

3. Spectacles according to claim 2 wherein the pivot posts are squarecone-shaped protrusions provided on distal ends of mating axial portions which are biased in opposite directions by a spring.

4. Spectacles according to claim 3 wherein the sheaths of the temples completely enclose the frame in the retracted position.

* * * * *